United States Patent
Burchett et al.

(10) Patent No.: US 9,110,963 B2
(45) Date of Patent: Aug. 18, 2015

(54) TRANSPARENT ADAPTIVE FILE TRANSFORM

(71) Applicant: Dell Inc, Round Rock, TX (US)

(72) Inventors: Christopher Burchett, Lewisville, TX (US); Warren Robbins, Celina, TX (US); James Michael Burke, Frisco, TX (US); James Darrell Testerman, McKinney, TX (US); David Albert Consolver, Dallas, TX (US)

(73) Assignee: Dell Inc, Round Rock, TX (US)

( * ) Notice: Subject to any disclaimer, the term of this patent is extended or adjusted under 35 U.S.C. 154(b) by 7 days.

(21) Appl. No.: 13/860,294

(22) Filed: Apr. 10, 2013

(65) Prior Publication Data

US 2013/0268545 A1      Oct. 10, 2013

Related U.S. Application Data (60) Provisional application No. 61/622,335, filed on Apr. 10, 2012.

(51) Int. Cl.
*G06F 17/30* (2006.01)

(52) U.S. Cl.
CPC .... *G06F 17/30569* (2013.01); *G06F 17/30896* (2013.01); *G06F 17/3089* (2013.01); *G06F 17/30563* (2013.01); *G06F 17/30914* (2013.01)

(58) Field of Classification Search
CPC .......... G06F 17/30896; G06F 17/30914; G06F 17/30563; G06F 17/3089
USPC .......... 707/602, 756, 754, 812, 706, 709; 711/104, 112, 206, 118, 114; 370/389
See application file for complete search history.

(56) References Cited

U.S. PATENT DOCUMENTS

| | | | | |
|---|---|---|---|---|
| 5,704,056 A | * | 12/1997 | Fujita et al. | 711/118 |
| 6,477,564 B1 | * | 11/2002 | Freyssinet et al. | 709/202 |
| 6,961,760 B2 | * | 11/2005 | Li et al. | 709/219 |
| 7,120,703 B2 | * | 10/2006 | Li et al. | 709/246 |
| 7,451,253 B2 | * | 11/2008 | Kim et al. | 710/38 |
| 7,467,284 B2 | * | 12/2008 | Dekker et al. | 711/206 |
| 7,716,390 B2 | * | 5/2010 | Takenouchi et al. | 710/22 |
| 7,953,885 B1 | * | 5/2011 | Devireddy et al. | 709/238 |
| 8,438,242 B2 | * | 5/2013 | Kishimoto | 709/219 |
| 8,694,721 B2 | * | 4/2014 | Haywood | 711/103 |
| 8,774,080 B2 | * | 7/2014 | Ishii et al. | 370/315 |
| 8,782,337 B2 | * | 7/2014 | Chiba et al. | 711/112 |
| 8,880,790 B2 | * | 11/2014 | Haywood | 711/104 |

(Continued)

FOREIGN PATENT DOCUMENTS

WO      WO 2005081555 A1 *  9/2005

*Primary Examiner* — Frantz Coby
(74) *Attorney, Agent, or Firm* — Fogarty, L.L.C.

(57) ABSTRACT

Embodiments of methods, systems, and services for transparent adaptive file transform are described. In one embodiment a method for transparent adaptive file transform is performed by a data processing device. The method may include automatically detecting a data transfer addressed to an external data storage. The method may also include redirecting data associated with the data transfer to a data transformer. Additionally, the method may include applying one or more data transforms to the data associated with the data transfer to generate a transformed data set. In an embodiment, the method may also include transferring the transformed data set to the external data storage. In one embodiment, the external data storage is a cloud storage facility.

18 Claims, 7 Drawing Sheets

(56) References Cited

U.S. PATENT DOCUMENTS

| | | | |
|---|---|---|---|
| 2004/0205613 A1* | 10/2004 | Li et al. | 715/523 |
| 2005/0144557 A1* | 6/2005 | Li et al. | 715/513 |
| 2005/0213571 A1* | 9/2005 | Barrack et al. | 370/389 |
| 2006/0085841 A1* | 4/2006 | Chavis et al. | 726/4 |
| 2007/0202862 A1* | 8/2007 | Mikkola | 455/417 |
| 2009/0316688 A1* | 12/2009 | Meenavalli | 370/352 |
| 2010/0070739 A1* | 3/2010 | Nakamura et al. | 712/29 |
| 2011/0231884 A1* | 9/2011 | Shmueli et al. | 725/114 |
| 2013/0054891 A1* | 2/2013 | Kawaguchi | 711/114 |
| 2013/0246199 A1* | 9/2013 | Carlson | 705/16 |

\* cited by examiner

TRANSPARENT ADAPTIVE FILE TRANSFORM

CROSS-REFERENCE TO RELATED APPLICATIONS

This application claims priority to U.S. provisional patent application Ser. No. 61/622,335 entitled "Transparent Adaptive File Transform," filed on Apr. 10, 2012, the entirety of which is incorporated herein by reference.

TECHNICAL FIELD

This specification relates generally to cloud-based technologies, and, more particularly, to methods, systems, and services for transparent adaptive file transform.

BACKGROUND

It is often useful for computer users to store data in external data storage. For example, a computer user may wish to backup data such that it may be recovered in the event of a disk failure. Computer users may also store data on external data storage devices that are accessible by more than one user for collaboration on data files. External data storage may provide a single storage point which is accessible my many devices, such as by a desktop computer, a laptop or other portable computer, a tablet computing device, a personal data assistant (PDA) or smartphone, or the like.

Several types of external data storage devices exist. Data may be stored on a flash memory drives, Secure Digital (SD) cards, external hard drive devices, network attached data storage devices, network accessible Redundant Array of Accessible Disk (RAID) devices, and cloud storage devices. Several other external data storage devices exist. Additionally, some data may be communicated to and stored on network accessible servers, such as email servers, and the like. Additionally, some systems may be configured for data redundancy by copying or otherwise synchronizing data from a local data storage device to an external data storage device, such as a local drive on another device.

Security is often a concern for external data storage. Some systems may be configured to encrypt data before sending it to the external data storage device. Generally such systems are preprogrammed, or preconfigured to encrypt data before sending it to the external data storage device. Such configuration is typically embedded within the application generating the data. In other embodiments, specific data sets designated for external storage are encrypted by the user prior to being transmitted to the external data storage. In some situations, encryption may be applied to the external data storage device once the data has been transmitted. Such systems are generally not sufficiently secure because the encryption keys may be held by more than one party. For example, if data is stored in a cloud storage device and then encrypted, the cloud storage service provider typically has access to the encryption keys.

It may also be useful to compress data transmitted to the external data storage so that space utilization is minimized. Compression is typically handled by the user. For example, the user may compress certain specified files or folders using a data compression utility. Once the files or folders are compressed by the user, they may be transferred to the external data storage device. Prior methods are typically cumbersome and require repeated user intervention.

SUMMARY

Embodiments of methods, systems, and services for transparent adaptive file transform are described. In one embodiment a method for transparent adaptive file transform is performed by a data processing device. The method may include automatically detecting a data transfer addressed to an external data storage. The method may also include redirecting data associated with the data transfer to a data transformer. Additionally, the method may include applying one or more data transforms to the data associated with the data transfer to generate a transformed data set. In an embodiment, the method may also include transferring the transformed data set to the external data storage. In one embodiment, the external data storage is a cloud storage facility.

In an embodiment, automatically detecting includes filtering data configured for transmission by a network interface according to predefined filtering criteria, the filtering criteria being used to automatically identify data that is designated for external storage. The predefined filtering criteria may include the data transfer being addressed to a network address in a set of network addresses associated with external data storage. In another embodiment, the predefined filtering criteria is that the data transfer is configured to be conducted on a network interface port in a predefined set of network interface ports configured to communicate with external data storage.

In one embodiment, automatically detecting further includes denoting an application which originated the data transfer and automatically redirecting data associated with data transfers from the denoted application to the data transformer.

The one or more data transforms may be selected from a predefined list of data transforms. In one embodiment, the predefined list of data transforms is customizable for an application originating the data transfer.

An embodiment of a system may include a network filter a file system filter, a data transformer, and a network interface. The network filter may be configured to automatically detect a data transfer addressed to an external data storage. The system may also include a file system filter configured to redirect data associated with the data transfer to a data transformer. In an embodiment, the system includes a data transformer configured to apply one or more data transforms to the data associated with the data transfer to generate a transformed data set. Additionally, the system may include a network interface coupled to the call-back file system configured to transfer the transformed data set to the external data storage.

In one embodiment, the system may also include a data protection controller configured to store a list of one or more applications denoted for originating a data transfer to an the external data storage. The data protection controller may designate one or more data transforms to be performed on the data by the data transformer. In one embodiment, the network filter is integrated with a network software stack for controlling transfers to data to remote devices.

Embodiments of a tangible computer-readable medium are also presented. The tangible computer-readable medium may include computer-executable code that, when executed by a data processing device, causes data processing device to perform operations corresponding to one or more of the embodiments of the methods and systems described herein.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Various embodiments of transparent adaptive file transform are described herein. Beneficially, such embodiments may provide safe use of any cloud data storage service which is known due to prior use. Additionally, the embodiments may provide greater transparency because there it may not be required to define or know a-priori the application, files, folders, web service API's, etc to be transformed. Additionally, benefits may include dynamic encryption for enhanced protection of files as they are uploaded to the service and decryption as they are downloaded to a local user interface device. The present embodiments may be adaptively applied for data protection for all known services. The ability to auto update such services may reduce administrative burden and avoid inadvertent data leakage.

Figure 1:
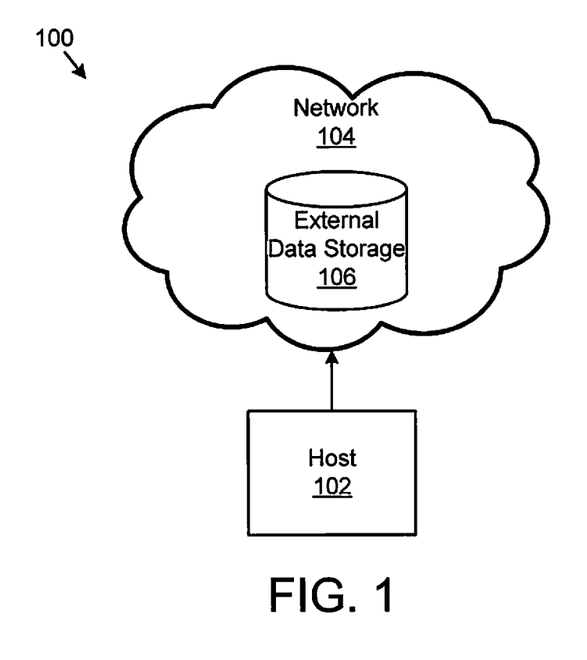
FIG. 1 is a schematic block diagram illustrating one embodiment of a system for transparent adaptive file transform.

FIG. 1 is a schematic block diagram illustrating one embodiment of a system 100 for transparent adaptive file transform. In one embodiment, the system 100 includes a host 102 and a network 104. The network 104 may also include an external data storage 106. In one embodiment, host 102 may communicate data to external data storage 106 through network 104. Alternatively, host 102 may directly connect to external data storage 106. The host 102 may be configured to store data on the external data storage 106.

In an embodiment, the host 102 may include a user interface device, such as a desktop computer, a laptop or other portable computer, a tablet computing device, a PDA or smartphone, or the like. In another embodiment, the host 102 may include an application server, a web server, a cloud configured server, or the like. In still further embodiments, the host 102 may include other devices that may be configured to generate data for storage in an external data storage 106, such as a database storage controller or management device. The host 102 may be configured to host an application, a database, a web service, or any other program, script, or computer executable code that is configured to generate a data transfer to the external data storage 106. Additionally, the host 102 may be configured to carry out one or more transparent adaptive file transform operations, according to various embodiments.

In one embodiment, network 104 may include the Internet. Alternatively, network 104 may include a public or private cloud services interconnection network. The network 104 may include a Personal Area Network (PAN), a Local Area Network (LAN), a Wide Area Network (WAN), or a Storage Area Network (SAN). The network 104 may include various network traffic handling devices, including routers, switches, data security devices, firewalls, quality of service controllers, network interface devices, or the like. These devices may be configured to facilitate communications between the host 102 and the external data storage 106.

The external data storage 106 may include flash memory drives, Secure Digital (SD) cards, external hard drive devices, network attached data storage devices, network accessible Redundant Array of Accessible Disk (RAID) devices, and cloud storage devices. In another embodiment, the external data storage 106 may include a network accessible server, such as an email server, or the like. In various embodiments, external data storage 106 may include complex data storage systems, including SANs, which may include a variety of data storage devices including RAID devices, tape storage devices, optical storage devices, holographic storage devices, etc. The SAN may be connected using one of a variety of connection methods, including Fibre-Channel Arbitrated-Loop (FC-AL), Small Computer Serial Interface (SCSI), mini SCSI, gigabit Ethernet, firewire, high speed wireless interfaces, or the like.

Figure 2:
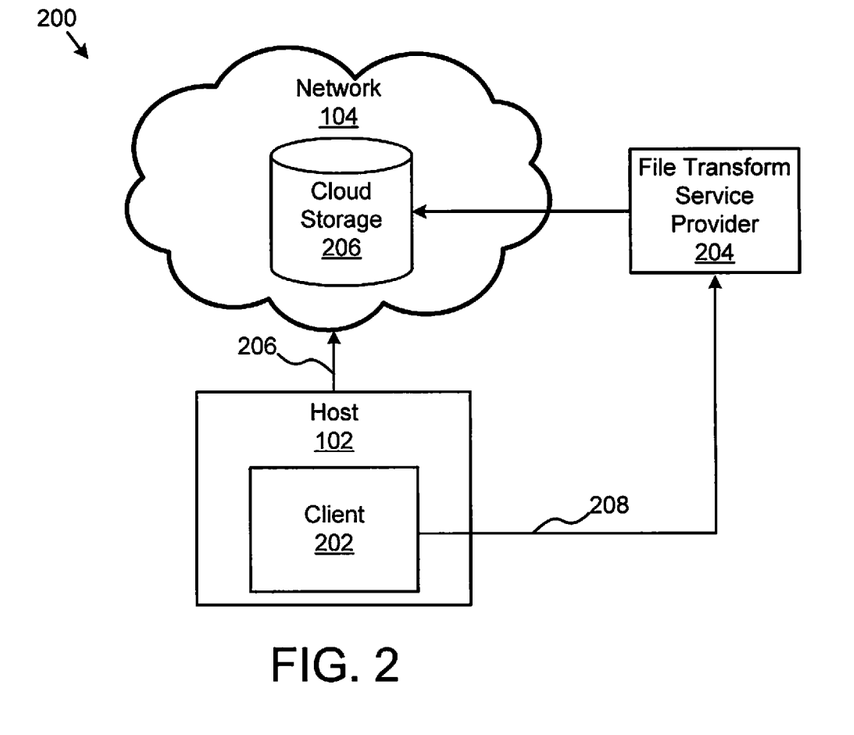
FIG. 2 is a schematic block diagram illustrating another embodiment of a system for transparent adaptive file transform.

FIG. 2 is a schematic block diagram illustrating one embodiment of a service provider system 200 for providing transparent adaptive file transform for storing data on cloud storage 206. In addition to the elements of the system 100 described above with relation to FIG. 1, the embodiment of FIG. 2 includes a file transform service provider 204. In one embodiment, the reseller system 200 may include servers, routers, switches, and other hardware devices for interfacing the network 104, including cloud storage 206, host 102, and file transform service provider 204. The host 102 may be coupled to file transform service provider 204 via connection 206 to network 104, in one embodiment. Alternatively, host 102 may be coupled to file transform service provider 204 via a secondary path 208.

In an embodiment, the host 102 may be configured with a client 202 for managing the portions of the transparent adaptive file transform functions described below. In a particular embodiment, file transform service provider 204 may include one or more Application Program Interfaces (APIs) for receiving communications from client 202. In such an embodiment, the file transform service provider 204 may store configuration files, lists of appellations designated as sync clients, or the like. In still a further embodiment, data may be redirected by client 202 to file transform service provider 204 which is configured to apply one or more data transforms to the data redirected by client 202. One of ordinary skill will recognize that the functions described herein may be distributed between the client 202 and the file service provider 204 in various alternative ways, and that the distributions may include various tradeoffs in performance of the system 200.

Figure 3:
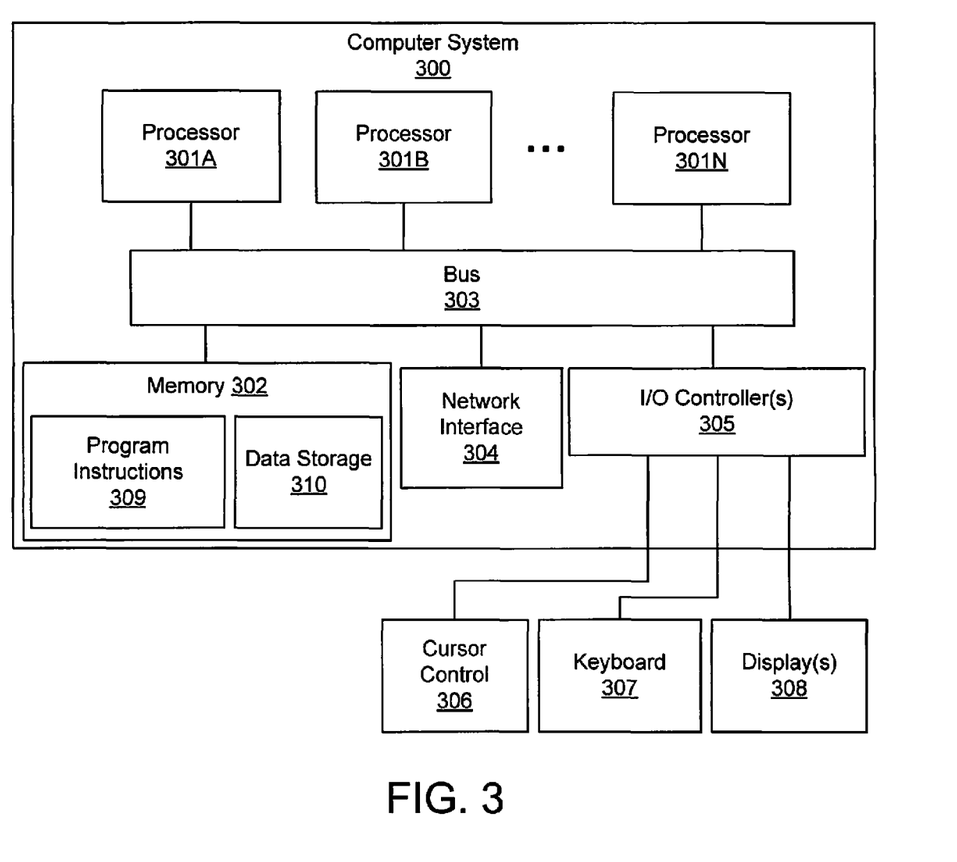
FIG. 3 is a schematic block diagram illustrating one embodiment of a computer system configurable for transparent adaptive file transform.

FIG. 3 is a schematic block diagram illustrating one embodiment of a computer system 300 configurable for transparent adaptive file transform. In one embodiment, host 102 may be implemented on a computer system similar to the computer system 300 described in FIG. 3. Similarly, file transform service provider 204 may be implemented on a computer system similar to the computer system 300 described in FIG. 3. In various embodiments, computer system 300 may be a server, a mainframe computer system, a workstation, a network computer, a desktop computer, a laptop, or the like.

As illustrated, computer system 300 includes one or more processors 302A-N coupled to a system memory 304 via bus 306. Computer system 300 further includes network interface 308 coupled to bus 306, and input/output (I/O) controller(s) 310, coupled to devices such as cursor control device 312, keyboard 314, and display(s) 316. In some embodiments, a given entity (e.g., host 102) may be implemented using a single instance of computer system 300, while in other embodiments multiple such systems, or multiple nodes making up computer system 300, may be configured to host different portions or instances of embodiments (e.g., client 202 and file transform service provider 204).

In various embodiments, computer system 300 may be a single-processor system including one processor 302A, or a multi-processor system including two or more processors 302A-N (e.g., two, four, eight, or another suitable number). Processor(s) 302A-N may be any processor capable of executing program instructions. For example, in various embodiments, processor(s) 302A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 302A-N may commonly, but not necessarily, implement the same ISA. Also, in some embodiments, at least one processor(s) 302A-N may be a graphics processing unit (GPU) or other dedicated graphics-rendering device.

System memory 304 may be configured to store program instructions and/or data accessible by processor(s) 302A-N. For example, memory 304 may be used to store software program and/or database shown in FIGS. 4-7. In various embodiments, system memory 304 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 304 as program instructions 309 and data storage 310, respectively. In other embodiments, program instructions and/or data may be received, sent or stored upon different types of computer-accessible media or on similar media separate from system memory 304 or computer system 300. Generally speaking, a computer-accessible medium may include any tangible, non-transitory storage media or memory media such as electronic, magnetic, or optical media—e.g., disk or CD/DVD-ROM coupled to computer system 300 via bus 306, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 306 may be configured to coordinate I/O traffic between processor 302, system memory 304, and any peripheral devices including network interface 308 or other peripheral interfaces, connected via I/O controller(s) 310. In some embodiments, bus 306 may perform any necessary protocol, timing or other data transformations to convert data signals from one component (e.g., system memory 304) into a format suitable for use by another component (e.g., processor(s) 302A-N). In some embodiments, bus 306 may include support for devices attached through various types of peripheral buses, such as a variant of the Peripheral Component Interconnect (PCI) bus standard or the Universal Serial Bus (USB) standard, for example. In some embodiments, the operations of bus 306 may be split into two or more separate components, such as a north bridge and a south bridge, for example. In addition, in some embodiments some or all of the operations of bus 306, such as an interface to system memory 304, may be incorporated directly into processor(s) 302A-N.

Network interface 308 may be configured to allow data to be exchanged between computer system 300 and other devices, such as other computer systems attached to network 104, for example. In various embodiments, network interface 308 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 310 may, in some embodiments, enable connection to one or more display terminals, keyboards, keypads, touch screens, scanning devices, voice or optical recognition devices, or any other devices suitable for entering or retrieving data by one or more computer system 300. Multiple input/output devices may be present in computer system 300 or may be distributed on various nodes of computer system 300. In some embodiments, similar I/O devices may be separate from computer system 300 and may interact with computer system 300 through a wired or wireless connection, such as over network interface 308.

As shown in FIG. 3, memory 304 may include program instructions 309, configured to implement certain embodiments described herein, and data storage 310, comprising various data accessible by program instructions 309. In an embodiment, program instructions 309 may include software elements of embodiments illustrated in FIGS. 4-7. For example, program instructions 309 may be implemented in various embodiments using any desired programming language, scripting language, or combination of programming languages and/or scripting languages. Data storage 310 may include data that may be used in these embodiments such as, for example, local storage 706 of FIG. 7. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Figure 4:
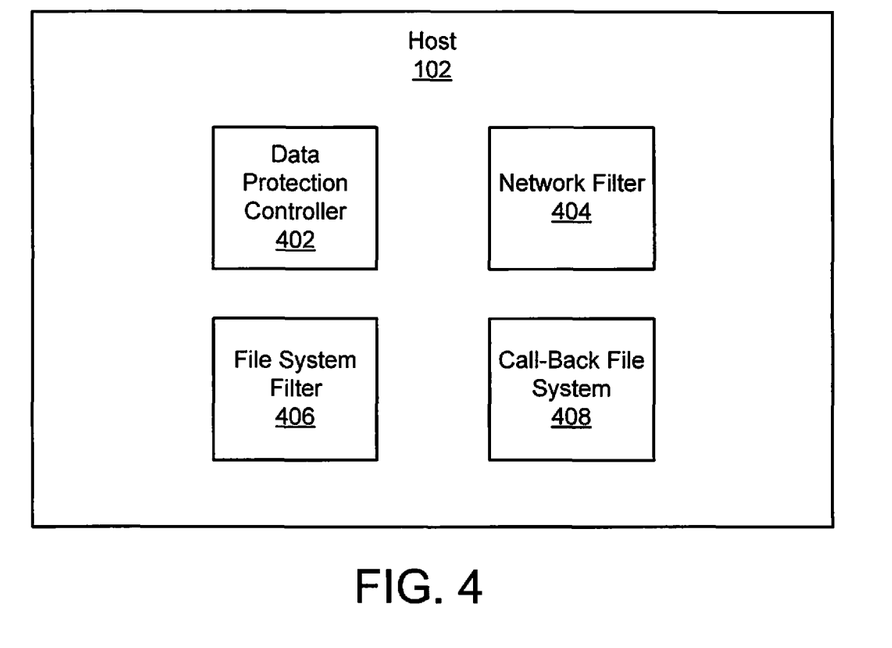
FIG. 4 is a schematic block diagram illustrating one embodiment of an apparatus for transparent adaptive file transform.
Figure 5:
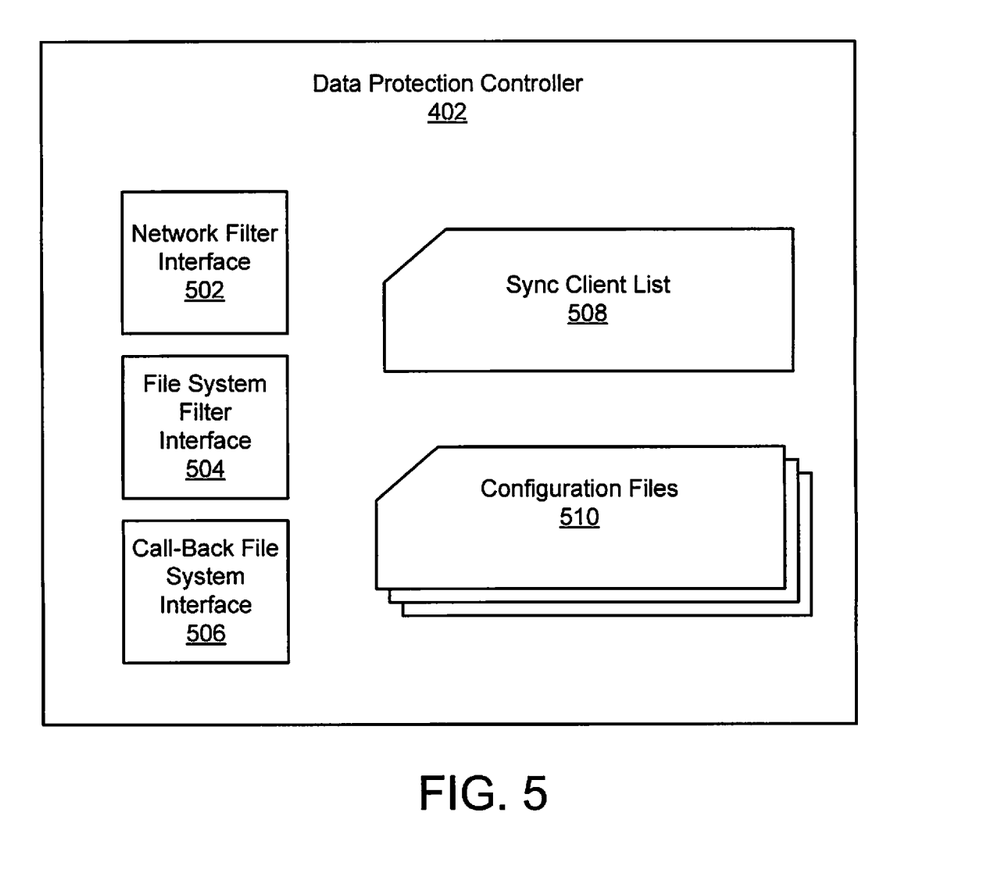
FIG. 5 is a schematic block diagram illustrating one embodiment of a data protection controller.
Figure 7:
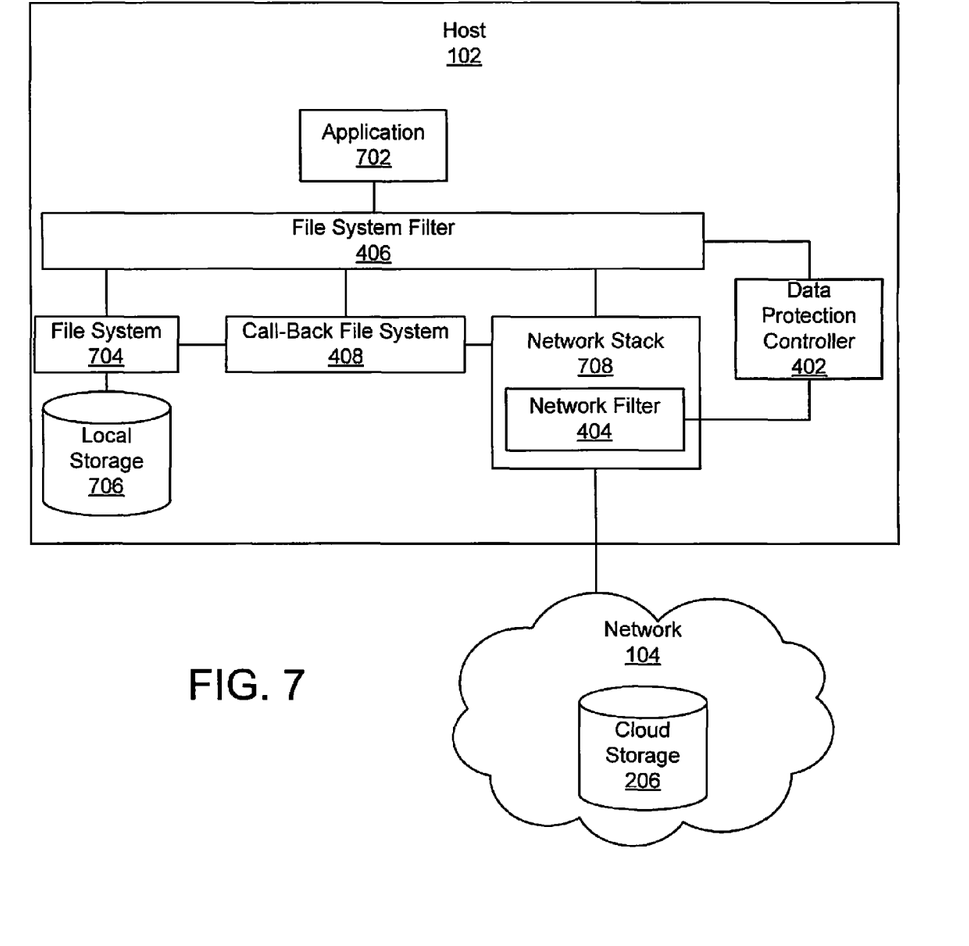
FIG. 7 is a schematic block diagram illustrating another embodiment of an apparatus for transparent adaptive file transform.

Embodiments of data protection controller 402, network filter 404, file system filter 406 and call-back file system 408 described in FIGS. 4-5 and 7 may be implemented in a computer system that is similar to computer system 300. In one embodiment, the elements described in FIGS. 4-5 and 7 may be implemented in discrete hardware modules. Alternatively, the elements may be implemented in software-defined modules which are executable by one or more of processors 302A-N, for example.

FIG. 4 is a block diagram illustrating one embodiment of a host 102 configured for transparent adaptive file transform. In one embodiment, the host 102 may include a data protection controller 402, a network filter 404, a file system filter 406, and a data transformer (call-back file system 408 in the present embodiment).

In one embodiment, data protection controller 402 controls the other components of host 102 and keeps a table denoting which applications are designated as "sync clients" which require data transformations. Additionally, data protection controller 402 may store configuration information that determines what type of transform should be applied (i.e. which encryption keys should be used, etc.). Data protection controller 402 may be implemented as a Windows service that stores the configuration information for the overall system. In some embodiments, the data protection controller 402 may query a policy server periodically to obtain updates to the configuration of actions, sync client identification parameters, and other system settings. In other embodiments, the data protection controller 402 is implemented as a process running on a server, e.g. file transform service provider 204 accessible over the network 104. In still further embodiments, data protection controller 402 may include a user interface module configured to receive configuration information from a user of host 102. Further embodiments of data protection controller 402 are described with reference to FIG. 5.

In one embodiment, the network filter 404 is implemented in software and monitors the host 102 to identify "sync clients" (applications executed on host 102 that generate data designated for storage on an external data storage 106 which requires transformation). The network filter 404 may utilize one or more of many different mechanisms to identify these sync clients. For example, network filter 404 may identify a sync client based on the IP address or domain name to which the program is connecting. In another embodiment, the network filter 404 may identify a sync client in response to the port on which the program is connecting to the external data storage 106. In still other embodiment, the network filter 404 may identify a sync client in response to the protocol to program is using, the patterns of data the program is sending, the name of the program, the size of the program's image in memory or on disk, behavioral patterns exhibited by the program (e.g. bursts of reads or writes), particular files or directories read by the program, etc.

In one embodiment, file system filter 406 may intercept read/write activities to perform actions for any application that has been previously recognized as a "sync client." For example, the file system filter 406 may be implemented as a piece of software that sits between applications and the operating system and intercepts read and write commands destined for the local file system. The file system filter 406 may selectively engage the call-back file system 408 to perform configured actions based on whether the read or write command is issued by an application that has been identified as a sync client by the network filter 404. In other embodiment, the file system filter 406 may be implemented in hardware, firmware, in a separate system, or the like.

In one embodiment, call-back file system 408 provides an extensible action pipeline that is applied to files dynamically as they are written/read by "sync client." For example, the call-back file system 408 can be configured to allow an action or a combination of actions to be performed on a file in response to an access by a sync client. In one embodiment, a data transform may include data compression. In another embodiment, a data transform my include encryption. In various other embodiments, data transforms may include, file-type transformation, rights management embedding, file name obfuscation, bulk upload, or a change of communications protocols. In still further embodiments, call-back file system 408 may be configured to create a backup or shadow copy of the data at a second location. In another embodiment, call-back file system 408 may perform content filtering (e.g. removal credit card information or other personal or private data). Call-back file system 408 may add or remove metadata. Additionally, call-back file system 408 may be configured to generate a generic response (e.g. "404 not found") in response to a predetermined event. In still other embodiments, call-back file system 408 may be configured to add an entry to an audit log showing the file activity. Such various embodiments may be implemented in any combination on a customizable basis. For example, the various actions may be set on an application-by-application basis, in response to the type of data access activity, in response to the content of the data being accessed by the sync client, in response to the particular external data storage 106 to which the data is destined, or the like.

FIG. 5 is a block diagram illustrating further embodiments of data protection controller 402. Data protection controller 402 may include a network filter interface 502, a file system filter interface 504, and a call-back file system interface 506. In one embodiment, the data protection controller 402 may also include a sync client list 508. Additionally, the data protection controller 402 may include one or more configuration files 510.

The network filter interface 502 may be coupled to the network filter 404 and configured to receive information from the network filter 404. For example, the network filter interface 502 may receive an indicia that a particular application or program is to be denoted as a sync client on the sync client list 508. The file system filter interface 504 may be coupled to the file system filter 406. The file system filter interface 504 may communicate information to the file system filter 406, including instructions for redirecting data from a sync client designated on the sync client list 508 to the data transformer (e.g., the call-back file system 408). The call-back file system interface 506 may be coupled to the call-back file system 408 and configured to communicate configuration information to the call-back file system 408. For example, call-back file system interface 506 may communicate configuration information stored in the one or more configuration files 510 to the call-back file system 408.

The sync client list 508 may be configured, in whole or in part, upon system initialization. For example, the sync client list 508 may be initially populated with a list of known sync clients when the data protection controller 408 is installed on host 102. Thereafter, the sync client list 508 may be updated dynamically in response to information received from the network filter 404, from a user, or from a remote server (e.g., file transform service provider 204). The sync client list 508 may comprise a file, a table, a database, a data array, an array of pointers, or the like. One of ordinary skill will recognize various alternative approaches for implementing sync client list 508.

Configuration files 510 may include a selection of one or more data transforms. The data transforms may include one or more of the operations that call-back file system 408 may be configured to perform. For example, data transforms may include data compression, encryption, file-type transformation, rights management embedding, file name obfuscation, bulk upload, change of communications protocols, or any other data transform operation. The configuration files may be configured to instruct call-back file system 408 to perform data transforms in any combination on a customizable basis. In one embodiment, each synch client may be assigned a separate configuration file 510. Alternatively, template configuration files 510 may be applied to multiple sync clients. One of ordinary skill will recognize various arrangements of configuration files which may be suitable for use with the present embodiments.

Figure 6:
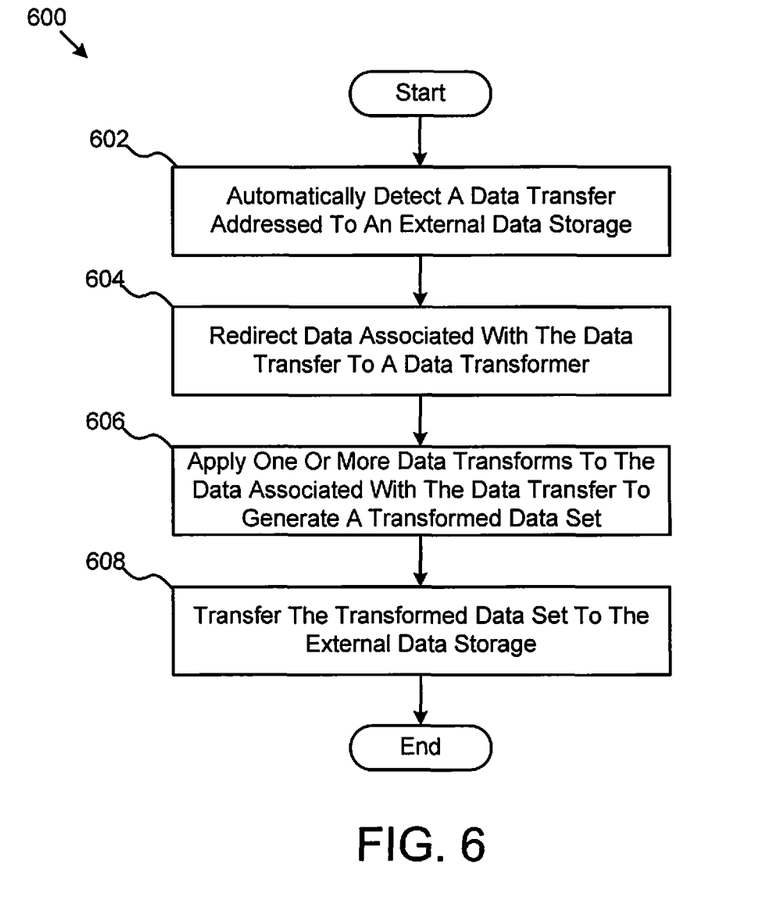
FIG. 6 is a schematic flowchart diagram illustrating one embodiment of a method for transparent adaptive file transform.

FIG. 6 is a flowchart diagram illustrating one embodiment of a method 600 for transparent adaptive file transform. In one embodiment, the method 600 starts when network filter 404 automatically detects 602 a data transfer addressed to an external data storage 106. The file system filter 406 may then redirect 604 the data associated with the data transfer to a data transformer. In one embodiment, the data transformer is call-back file system 408. In such an embodiment, call-back data transformer 408 may apply 606 one or more data transforms to the data associated with the data transfer to generate a transformed data set. The host 102 may then transfer 608 the transformed data set to the external data storage 106.

FIG. 7 is a block diagram illustrating another embodiment of a host 102 configured for transparent adaptive file transform. In one embodiment, host may include an application 702 configured to generate data for storage. The application 702 may store the data on a local storage device 706, in one embodiment. Alternatively, the application 702 may be configured to store the data on an external data storage 106, such as cloud storage 206 via network 104. In still a further embodiment, the application 702 may be configured to store some data on local storage 706 and other data on cloud storage 206.

File system filter 406 may be configured to intercept data operations from the application 702. If the data operation is directed to the file system 704 for storage on local storage device 706, the file system filter 406 may not interfere, and the data operation may be carried out by file system 704 without being redirected to call-back file system 408. Similarly, if application 702 is not on the sync client list 508, the file system filter 406 may simply pass data traffic to network stack 708 without interference. Network stack may be configured to package the data, add metadata, and otherwise facilitate transfer of data over network 104.

In one embodiment, network stack 708 may include network filter 404 which is configured to determine whether network traffic from application 702 is data designated for transmission to cloud storage 206. For example, network filter 404 may be configured to compare the address of cloud storage 206 with addresses for known cloud storage devices. In another embodiment, network filter 404 may be configured to check the designated communication port and compare the designation with ports commonly used for communication to cloud storage 206. One of ordinary skill will recognize that several methods, including those described above may be used in accordance with the present embodiments to automatically detect 602 a data transfer addressed to cloud storage 206.

If network filter 404 determines that the data transfer is addressed to cloud storage 206, it may block the data transfer, and send a communication to data protection controller 402 over network filter interface 502 for updating the sync client list 508 to include application 702. In one embodiment, application 702 may resend the data in response to the communication being blocked by network filter 404. File system filter 406 may check sync client list 508 or otherwise receive an update from data protection controller over file system filter interface 504 that application 702 has been added to sync client list 508. In response, file system filter 406 may redirect 604 the data transfer to call-back file system 408.

Call-back file system 408 may receive configuration information from configuration files 510 from data protection controller 402 over call-back file system interface 506. The configuration file 510 may include, for example, the encryption key to be used for encrypting the data prior to transmission. The configuration file 510 may also include a designation of a set of metadata to be included with the data prior to transfer. Additionally, configuration file 510 may specify data compression parameters for data compression to be applied to the data. In still a further embodiment, configuration file 510 may include identification of certain data to retrieve from file system 704 during the data transform operation. Call-back file system 408 may then apply 606 one or more data transforms on the data generated by application 702 in response to information contained in the configuration file 510 to generate a transformed data set. Call-back file system 408 may then communicate the transformed data set to network stack 708 for transmission over network 104. If network stack 708 receives the transformed data set from call-back file system 408, or if the transformed data set is otherwise tagged by call-back file system 408, then network filter 404 may allow network stack 708 to transfer 608 the transformed data set to cloud storage 206 over the network 104.

Network filter 404 may or may not be implemented in network stack 708 in various embodiments. In another embodiment, network filter 404 may operate in a hypervisor that runs underneath the operating system of host 102. In still another embodiment, network filter 404 may be implemented as part of a client 202 application that runs on host 102. In still other embodiments, network filter may run on an external appliance, such as a network router or firewall appliance, and may dynamically block network traffic addressed to external storage 106. One of ordinary skill in the art will recognize that network filter 404 may be configured to operate in one or more different network layers including, for example, the application layer.

Similarly, one of ordinary skill in the art will recognize that the file system filter 406 may be implemented in various ways. For example, file system filter 406 may be installed as part of an operating system loaded on host 102. In another embodiment, file system filter 406 may be configured as a part of a client 202 application that runs on host 102.

Data protection controller 402 may be similarly implemented. For example, in one embodiment, data protection controller 402 may be configured to run on an external device, such as file transform service provider 204. The sync client list 508 and the configuration files 510 may be stored in the local storage 706, in one embodiment. In another embodiment, sync client list 508 and configuration files may be stored externally, for example, in association with file transform service provider 204.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. In a computer system having a processor and a memory coupled to the processor, the memory having program instructions stored thereon that, upon execution, cause the computer system to perform transparent adaptive file transform operations, a method comprising:
    automatically detecting data transfers originated by an application hosted by the computer system;
    blocking at least of the data transfers until receiving confirmation that the application has been added to a client list;
    determining whether the blocked data transfer is addressed to an internal data storage or to an external data storage;
    in response to a first portion of data associated with the blocked data transfer being addressed to an internal storage, transferring the first portion of data to the internal data storage without applying one or more data transforms to the first portion of data; and
    in response to a second portion of data associated with the blocked data transfer being addressed to the external storage, applying the one or more data transforms to the second portion of data to generate a transformed data set and transferring the transformed data set to the external data storage, wherein the one or more data transforms are selected from a predefined list of data transforms.

2. The method of claim 1, wherein the external data storage is a cloud storage.

3. The method of claim 1, wherein automatically detecting further comprises filtering data configured for transmission by a network interface according to a predefined filtering criteria, the filtering criteria being used to automatically distinguish the first portion of data from the second portion of data.

4. The method of claim 3, wherein the predefined filtering criteria includes that the data transfer be addressed to a network address in a set of network addresses associated with the external data storage.

5. The method of claim 3, wherein the predefined filtering criteria further includes that the data transfer be configured to be conducted on a network interface port in a predefined set of network interface ports configured to communicate with the external data storage.

6. The method of claim 1, wherein automatically detecting the data transfers further comprises identifying the application among a plurality of other applications.

7. The method of claim 1, wherein the predefined list of data transforms is customizable for the application.

8. A memory device having program instructions store thereon that, upon execution by a data processing device, causes the data processing device to:
    automatically detect data transfers originated by an application hosted by the data processing device;
    determine whether a data transfer is addressed to an internal data storage or to an external data storage;
    in response to a first portion of data associated with the data transfer being addressed to an internal storage, transfer the first portion of data to the internal data storage without applying one or more data transforms to the first portion of data; and
    in response to a second portion of data associated with the data transfer being addressed to the external storage, apply the one or more data transforms to the second portion of data to generate a transformed data set and transfer the transformed data set to the external data storage, wherein the one or more data transforms are selected from a predefined list of data transforms, and wherein the program instructions, upon execution by the data processing device, further cause the data processing device to, prior to applying the one or more data transforms to the second portion of data, blocking the data transfer until receiving confirmation that the application has been added to a client list.

9. The memory device of claim 8, wherein the external data storage is a cloud storage.

10. The memory device of claim 8, wherein to automatically detect the data transfers, the program instructions, upon execution by the processor further cause the data processing device to filter data configured for transmission by a network interface according to a predefined filtering criteria, the filtering criteria being used to automatically distinguish the first portion of data from the second portion of data.

11. The memory device of claim 10, wherein the predefined filtering criteria includes that the data transfer be addressed to a network address in a set of network addresses associated with the external data storage.

12. The memory device of claim 10, wherein the predefined filtering criteria further includes that the data transfer be configured to be conducted on a network interface port in a predefined set of network interface ports configured to communicate with the external data storage.

13. The memory device of claim 8, wherein to automatically detect the data transfers, the program instructions, upon execution by the data processing device, further cause the data processing device to identify the application among a plurality of other applications.

14. The memory device of claim 8, wherein the predefined list of data transforms is customizable for the application.

15. A system, comprising:
    a processor; and
    a memory coupled to the processor, the memory having program instructions stored thereon that, upon execution by the processor, cause the system to:
    automatically detect data transfers originated by an application hosted by the computer system;
    determine whether a data transfer is addressed to an internal data storage or to an external data storage;
    in response to a first portion of data associated with the data transfer being addressed to an internal storage, transfer the first portion of data to the internal data storage without applying one or more data transforms to the first portion of data; and
    in response to a second portion of data associated with the data transfer being addressed to the external storage, apply one or more data transforms to the second portion of to generate a transformed data set, block the data transfer until receiving confirmation that the application has been added to a client list, and, in response to the confirmation, transfer the transformed data set to the external data storage.

16. The system of claim 15, wherein the program instructions, upon execution by the processor, further cause the system to store a list of one or more applications denoted for originating a data transfer to the external data storage.

17. The system of claim 15, wherein the program instructions, upon execution by the processor, further causes the system to designate one or more data transforms to be performed on the second portion of data.

18. The system of claim 15, wherein the program instructions, upon execution by the processor, further causes the system to control transfers of data to remote devices.

* * * * *